United States Patent [19]

Firatli et al.

[11] Patent Number: 5,394,862

[45] Date of Patent: Mar. 7, 1995

[54] HEATABLE APPLIANCE FOR PERSONAL USE

[75] Inventors: Ahmet C. Firatli, Wiesbaden-Breckenheim; Friedrich Henninger, Kelkheim; Norbert Schaefer, Frankfurt am Main; Michael Stolper, Eschborn; Winfried Ziemann, Sulzbach, all of Germany

[73] Assignee: Braun Aktiengesellschaft, Frankfurt, Germany

[21] Appl. No.: 891,817

[22] Filed: Jun. 1, 1992

[30] Foreign Application Priority Data

Jun. 9, 1991 [DE] Germany ........................ 41 19 018.1
Jan. 15, 1992 [DE] Germany ........................ 42 00 852.2

[51] Int. Cl.$^6$ .............................................. F23D 3/40
[52] U.S. Cl. ...................................... 126/409; 431/7; 431/329; 431/326
[58] Field of Search ................... 431/7, 268, 100, 326, 431/328, 329, 347; 126/401, 409, 408, 414, 413, 92 AC

[56] References Cited

U.S. PATENT DOCUMENTS

| 81,734 | 9/1868 | Barbarin | 431/268 |
|---|---|---|---|
| 582,985 | 5/1897 | De Brouwer | 431/268 X |
| 651,875 | 6/1900 | Martini | 431/268 |
| 680,813 | 8/1901 | Simonini | 431/268 |
| 856,578 | 6/1907 | Gotty | 431/268 |
| 1,994,390 | 3/1935 | Gibson | 431/268 |
| 2,336,816 | 12/1943 | Thompson | 431/100 X |
| 2,828,814 | 4/1958 | Lankin, Jr. | 431/347 X |
| 3,204,683 | 9/1965 | Ruff et al. | 431/347 X |
| 4,203,719 | 5/1980 | Brandt | 431/347 X |
| 4,248,208 | 2/1981 | Diederich | 126/409 |
| 4,361,133 | 11/1982 | Bonnema | |
| 4,399,185 | 8/1983 | Petrow | |
| 4,480,988 | 11/1984 | Okabayashi et al. | 431/347 X |
| 4,524,094 | 6/1985 | Lindstrom et al. | |
| 4,631,024 | 12/1986 | Shibata et al. | |
| 4,635,382 | 1/1987 | Bourdeau | 126/409 X |
| 4,960,378 | 10/1990 | Jannemann et al. | 431/326 X |
| 5,096,611 | 3/1992 | Suppiah et al. | 431/329 X |
| 5,137,583 | 8/1992 | Parent et al. | 431/100 X |

FOREIGN PATENT DOCUMENTS

725292 3/1932 France ............................. 431/347

*Primary Examiner*—Carl D. Price
*Attorney, Agent, or Firm*—Fish & Richardson

[57] ABSTRACT

The invention is directed to a heatable appliance, in particular a curling iron (10), including a device (18) for flameless combustion of a fuel/air mixture and an associated activation device (20, 21) for initiating the flameless combustion action, wherein the device (18) comprises a carrier means coated with a catalytically active material. According to the present invention, the carrier means is configured as a stable carrier structure (28) comprised in particular of a metal foil provided with perforations (32) or a wire lattice. At least one metal wire (36) preferably catalytically coated is arranged on the carrier structure (28) to serve as a starter catalyst (34). By this means, the activating ability of the catalytically coated carrier structure (28) is promoted.

18 Claims, 4 Drawing Sheets

HEATABLE APPLIANCE FOR PERSONAL USE

This invention relates to a heatable appliance for personal use, in particular a hair-care appliance, including a device for flameless combustion of a fuel/air mixture and an associated activation device for initiating the flameless combustion action, wherein the device comprises a carrier means having deposited thereon a catalytically active coating.

An appliance of this type is known, for example, from U.S. patent application Ser. No. 4 361 133. The device for flameless combustion is comprised of catalytically coated quartz fibers which, for reasons of mechanical stability and a sufficiently accurate locating ability, are arranged between spiral springs serving a supporting function for the quartz fibers. The catalytically effective quartz fibers serve for the flameless combustion of a fuel/air mixture supplied, the combustion heat being utilized for heating an appliance for personal use as, for example, for heating a gas-operated curling iron. However, the catalytic combustion action of the fuel/air mixture does not start until the catalytically active material has reached a specific activation temperature (LOT-light-off temperature). The energy required for attainment of the activation temperature of the catalyst is supplied to the catalyst by means of an associated activation device. This activation device ignites a fuel/air mixture fed to a combustion chamber of the appliance after the fuel supply is started, the ignition being accomplished by means of one or several sparks or a flame introduced from outside, with the ignited fuel/air mixture becoming extinguished automatically within a fraction of one or several seconds. The energy released by this ignition is, however, sufficient to heat at least isolated zones of the catalyst to the activation temperature and to set off the catalytic, that is, the flameless combustion within the catalyst.

Whilst this appliance, sold in quantities in the million range in the past years, is well-established in practice, experience has shown that in some aspects the device for flameless combustion is still capable of improvement. First, the mechanical instability of the quartz fibers and the resultant need to locate them in position by means of a mechanically stable supporting structure have given rise to problems. In the use of an appliance equipped with a catalyst of the type referred to above, it may happen that isolated ones of the quartz fibers fall out of their mechanical supporting structure which may adversely affect the passage of fuel by causing (partial) clogging of the fuel metering nozzle. Furthermore, such loss of fiber may result in a deterioration of the activation action of the appliance, in particular where a piezoelectric igniter is used. Finally, the quartz fibers are not in a position to ensure a consistent flow resistance at all times, so that hot spots may occur in partial areas of the catalyst. This impairs the service life of the catalyst materially.

To overcome such prior-art difficulties, in a copending patent application Ser. No. 07/910,266 filed by the applicant, a catalyst is disclosed which includes a stable carrier structure provided with a coating containing a catalytically active material, and in which a parameter obtained from the actual surface of the coating of the catalyst and the volume of the carrier structure assumes predetermined values. The disclosure content of this U.S. patent application Ser. No. 07/910,266 is incorporated in the present application by express reference. To the extent necessary, the subject-matter of the present application, both taken alone and in combination with any constituent part of the disclosure content of the U.S. application referred to, form the subject-matter of the present invention or advantageous embodiments thereof.

On the other hand, catalysts having a stable carrier structure as, for example, solid catalysts, catalysts fabricated of bulk material, catalysts with a monolithic carrier structure, catalysts made of ceramic or metal braiding or fabric are also known to have shortcomings. Due to their relatively high material mass, more energy is required to heat these catalysts to the activation temperature (LOT). For the heatable appliance for personal use, an increased energy supply for activation of the catalysts means that the appliance has to be equipped with a relatively large volume for receiving the fuel/air mixture, so that this mixture, when ignited, provides sufficient thermal energy for activation of the catalyst with its stable carrier structure.

It is an object of the present invention to improve upon a heatable appliance for personal use incorporating the features initially referred to, such as to avoid the problems of the fiber catalyst in the manufacture, installation and use of the catalyst, yet ensuring its good activation ability. By configuring the carrier means as a stable carrier structure comprised in particular of a perforated metal foil or a wire lattice, with at least one, preferably catalytically coated, metal wire being arranged on the carrier structure to serve as a starter catalyst, the advantages of catalysts equipped with a stable carrier structure are achieved in terms of their manufacturing ability and during use; secondly, by ignition of the fuel/air mixture, the starter catalyst is first heated to a temperature above the activation temperature reliably, so that initially the catalytic combustion sets in at the coating of the metal wire or metal wires of the starter catalyst. Following a brief period in the range of a few seconds, the red-hot metal wires of the starter catalyst have developed and transmitted to the carrier structure sufficient thermal energy, enabling the carrier structure to attain the activation temperature at least locally and promote the catalytic oxidation reaction. Following a further brief period in the second range, the entire carrier structure is heated to temperatures above the activation temperature due to internal heat conduction, performing practically exclusively the catalytic oxidation reaction of the fuel/air mixture. It is a further advantage that the metal wire or wires, owing to their resilience, can be readily processed into strands or spirals, do not break, are deformable into any desired shape and can also be welded together. Still further, it is an advantage that the use of a starter catalyst enables the volume of the ignitable mixture needed for activation of the main catalyst to be reduced. This makes it possible to reduce the overall size of the appliances.

In an embodiment of the present invention, metal wires of a thickness less than 0.3 mm are used. Metal wires of a diameter of between 0.03 mm and 0.1 mm have proved to be particularly advantageous. Owing to these relatively thin wires, the amount of heat dissipated is less than in the main catalyst, so that only a small amount of energy has to be supplied for heating to temperatures above the activation temperature.

In a further embodiment of the present invention in which a fuel/air mixture of a volume V is ignitable by means of the activation device, the ratio V/Q of this volume V to the wire cross-section Q of the metal wire or metal wires of the starter catalyst is greater than $10^6$ mm. For the embodiment of a curling iron as represented, this dimensioning ratio provides a rule which, when observed, ensures that the starter catalyst is in a position to be activated under any boundary condition occurring in practice. It is noted that the volume V entering into the dimensioning rule means the volume of the ignitable mixture which is not necessarily identical to the inner volume of the heatable body of the appliance for personal use. In the present embodiment, for example, in which an ignition occurs outside the carrier structure, the inner volume of the carrier structure has to be deducted from the volume of the ignitable mixture, because the carrier structure acts as a flame arrester and does not allow a spontaneous combustion of the mixture present in the carrier structure during the starter reaction.

Advantageously, the starter catalyst is in thermal contact with the carrier structure and is secured thereto with free, spread-apart sections having a length of at least 3 mm and up to 10 mm, preferably 5 mm.

In a further development of the present invention, the metal wire is fastened to the downstream end of the carrier structure configured in particular as a hollow cylinder. The combustible mixture is thereby withdrawn from the metal wires of the starter catalyst when the catalytic combustion has set in at the carrier structure. This then inhibits the further supply of a combustible mixture to the starter catalyst. As a result, the starter catalyst is subjected to a relatively low thermal load, since it is only activated during the starter reaction.

In an advantageous further development of the present invention, the starter catalyst is comprised of several, particularly five to ten, preferably seven, metal wires processed in particular into a strand which preferably unravel when cut off and are coated with a catalytically active material. The starter catalyst affords a particularly good function if about seven metal wires are arranged on the carrier structure. The starter catalyst being made of a strand which preferably becomes unravelled when cut off, it can be readily secured to the carrier structure. Finally, it has also proved highly advantageous that a catalytically active coating is deposited on the metal wires of the starter catalyst, enabling it to release heat energy actively during the starter reaction by catalytic combustion of the mixture. In actual fact, practical tests have also revealed that under various circumstances uncoated metal wires made of a catalytically active material as, for example, platinum, contribute equally to a significant improvement of the activating ability of the carrier structure.

In a further embodiment of the present invention, the at least one metal wire is configured to extend along the underside of a lid and is secured to the carrier structure at a location between the lid and an annular wall of the carrier structure particularly by a connection formed by clamping or spot welding of the lid to the annular wall. This affords a particularly simple manufacture and mounting of the starter catalyst on the carrier structure.

In another advantageous development of the present invention, the starter catalyst is placed into cutouts provided on the annular wall and is located in position by folding down the wall segments formed between the cutouts.

The starter catalyst being comprised of a metal wire or wire tuft having two free ends and arranged preferably symmetrically on the carrier structure, in particular on its downstream section remote from the holding ring, the efficiency of the starter catalyst is still further improved. The activating ability of the catalyst is dependent on the flame propagation and thus also on the composition of the mixture during the starter reaction. Experience has shown that starter catalysts configured in this manner are suitable for use in a wider mixture range. This permits the adjustment of a stoichiometric mixture and an improved combustion. In particular, a starter catalyst having two free ends is indifferent to the arrangement of the activation device for initiating the flameless combustion and is largely independent of the respective flame propagation during ignition of the mixture in the starting phase.

In principle, the starter catalyst may be secured to the carrier structure at any desired location, the individual metal wires extending into the space in any direction. The metal wires may be of varying shapes, their free length being preferably 5 mm or more. In particularly advantageous arrangements, the starter catalyst is configured as at least one wire tuft formed by means of the metal wire or the strand, as a spiral or annular spiral, a lattice made of wire meshes, a wire arc, or a wire loop. The special configuration of the starter catalyst depends largely on the form of the carrier structure employed and the shape of the volume surrounding the carrier structure and formed by the body to be heated.

In another highly advantageous embodiment of the present invention, the at least one metal wire is provided on the carrier structure in the form of a lid comprised of wire mesh, the lid being connected to the carrier structure. The advantage of this embodiment is that the wire-mesh lid can be manufactured with precision, dimensional accuracy and a low rejection rate and is easier to manipulate during manufacture than one or several individual wires. These advantages reduce the manufacturing cost of the catalyst in addition to providing the possibility of a fully automated manufacture of the component.

In an embodiment affording a particularly straightforward construction, the carrier structure possesses essentially the shape of a hollow cylinder and the lid is seated in an opening of the hollow cylinder.

Particularly advantageously, the wire mesh of the lid is made of wires having a diameter of less than 100 micrometers, preferably 50 micrometers $+/-15$ micrometers, with a mesh size of in particular between 100 and 800 micrometers, preferably 270 micrometers. As a result, the heat dissipated in the wire mesh is less than in the carrier structure, so that the supply of only a relatively low amount of energy will suffice to heat the wire mesh to values particularly above the activation temperature.

In a further embodiment of the present invention, the lid is comprised of a bottom member with an annular wall and has a diameter corresponding approximately to the inside diameter of the carrier structure. Owing to this dimensioning, the lid is readily insertable in the carrier structure and is adapted to be connected thereto without further means.

By causing the annular wall to protrude from the carrier structure by a projection amounting to between 0 mm and 5 mm, preferably between 0.5 mm and 2 mm, approximately, particularly safe starting of the catalyst in the entire application range is ensured. The ends of the wires of the wire mesh projecting from the carrier structure are heated to values above the activation temperature already by the supply of a low amount of energy.

In a particularly preferred embodiment, the lid is welded to the carrier structure at several locations and/or the projection of the annular wall is angled in outward direction by an angle greater than 30°, in particular about 45° to 135°, relative to the longitudinal axis of the carrier structure. By this means, an intimate contact is established in the application of the coating at the junctions of the wire mesh and the expanded metal, ensuring reliable heat conduction from the lid to the carrier structure. These heat conducting bridges are preferably provided on the catalyst at a location where, on ignition of the gas/air mixture, the flame front reaches the carrier structure in the area of the lid first.

Further objects, features, advantages and application possibilities of the present invention will become apparent from the subsequent description of embodiments. It will be understood that all features described and/or represented by illustration, whether taken alone or in any desired combination, also in combination with the disclosure content of U.S. patent application Ser. No. 07/910,266, form the subject-matter of the present invention, irrespective of their summarization in the claims or their back-references.

Figure 1:
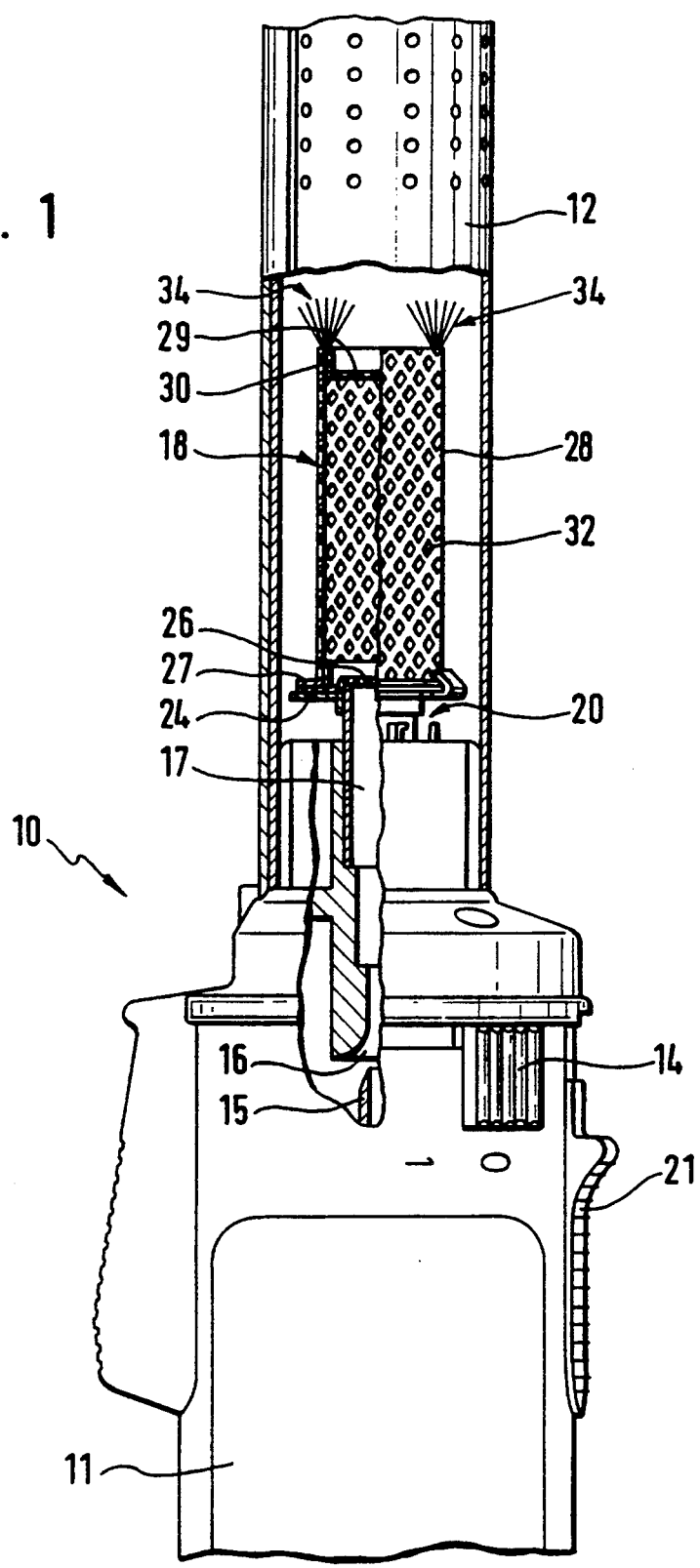
FIG. 1 is a side view of a section of a gas-operated curling iron, shown partly broken away.

Referring now to FIG. 1 of the drawings, there is shown a fragmentary view of a curling iron 10 with a hair winding portion 12 partly broken away and a handle 11. A nozzle 15 for operation of the curling iron is opened by means of a switch 14. Gas held in a reservoir not shown which is received in the handle 11 flows through the nozzle 15 into a Venturi tube 16. In this area, the fuel discharged from the nozzle 15 mixes intimately with the ambient air supplied or aspirated from outside. Adjoining the Venturi tube 16 is a tube 17 supplying the fuel/air mixture to a catalyst assembly 18 arranged in the interior of the hair winding portion 12. Ignition electrodes 20 are disposed between the Venturi tube 16 and the catalyst assembly 18. The ignition electrodes 20 serve the function of producing one or several sparks for igniting the fuel/air mixture inside the hair winding portion 12. The ignition electrodes 20 are actuated by means of a slide switch 21 provided on the handle 11 and operating on a piezoelectric element. With the catalyst assembly 18 suitably dimensioned, the energy released by the combustion of the fuel/air mixture contained in the hair winding portion 12 is sufficient to heat the catalyst assembly to an operating temperature, that is, to activate it, in order to thus initiate the flameless combustion of the fuel/air mixture by means of the catalyst assembly 18. The initial ignition explosion of the fuel/air mixture ignited by the ignition electrodes 20 becomes extinguished within fractions of a second by the blast wave in the space in the interior of the hair winding portion 12 which space is essentially encased on all sides, causing the catalytic combustion of the fuel/air mixture to be initiated automatically without the need for further manipulation on the appliance. In lieu of using ignition electrodes 20 for ignition, a friction wheel igniter, a helical heating wire with battery or an open flame supplied from outside may be used with equal advantage.

Figure 2:
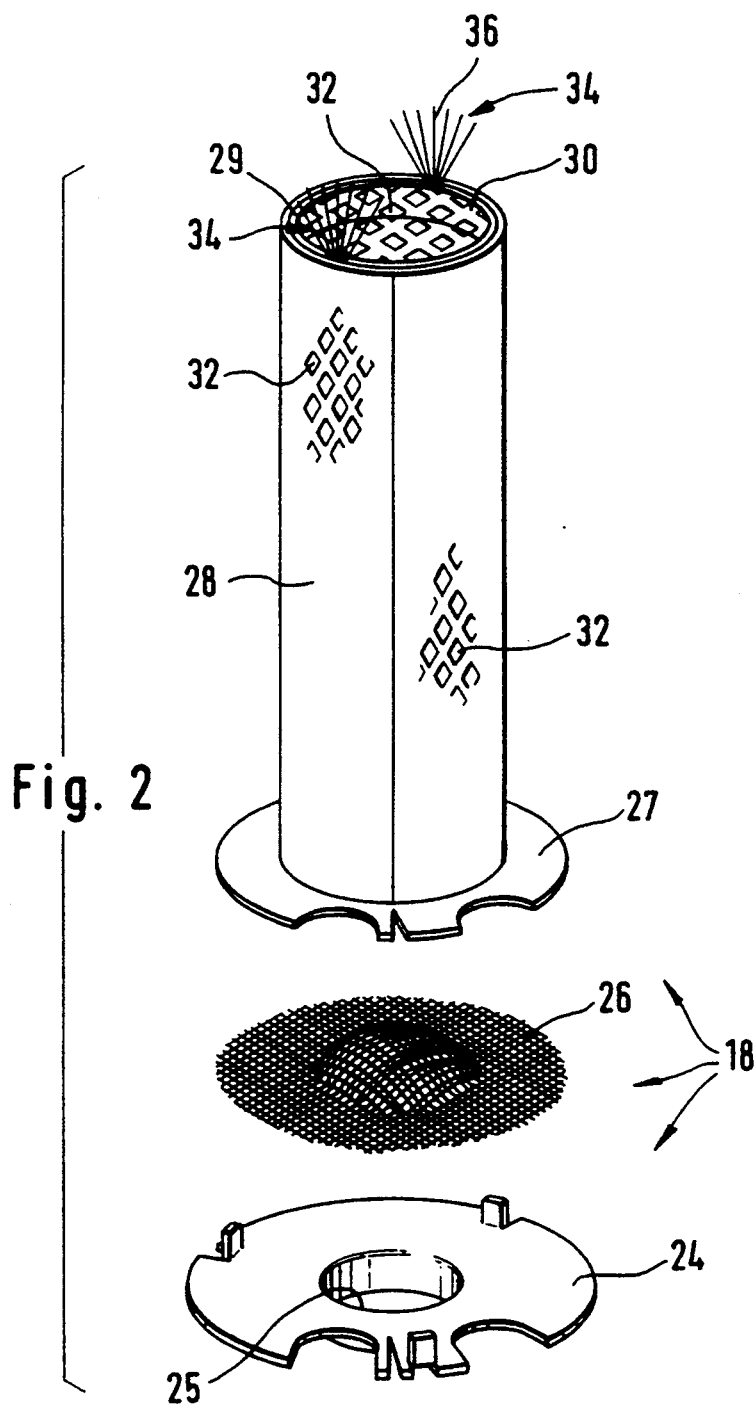
FIG. 2 is an exploded view of the catalyst assembly with a starter catalyst.

As becomes apparent from FIG. 1 and more clearly from FIG. 2, the catalyst assembly 18 is comprised of a mounting plate 24 having a central aperture 25 and adjoining the tube 17. Arranged between this mounting plate 24 and a holding ring 27 is a distributor 26 made of a screen fabric with a mesh size in the range of between 50 and 500 micrometers, particularly 180 micrometers, approximately. The distributor 26 serves the function of producing a uniform flow pattern of the fuel/air mixture within the catalyst assembly 18 and ensures an even, homogeneous combustion. The holding ring 27 holds a hollow-cylindrical carrier structure 28 closed at one end. At its upper end, the carrier structure 28 a lid 29 secured thereto so as to be somewhat recessed in the interior of the hollow cylinder and closing the hollow cylinder in downstream direction by forming an annular wall 30. The lid 29 may be provided with perforations 32 over the entire or a partial area thereof, or it may have no perforations 32 at all.

In the area of the lid 29, a starter catalyst 34 is arranged which in the embodiment of FIGS. 1, 2 is comprised of several, preferably five to ten, in particular seven, metal wires 36 twisted together to form a strand. The strand is passed along the underside of the lid 29 and is clampingly held in position between the outer periphery of the lid 29 and the annular wall 30 of the carrier structure 28. The lid 29 being connected with the annular wall 30 by spot welding, it is within the scope of the present invention to spot-weld also the strand to the lid 29 or to the annular wall 30. By means of such a self-supporting catalyst which possesses a starter catalyst, the advantages of good mechanical stability of self-supporting catalysts are combined with the excellent activating ability of fiber catalysts. In this embodiment, the one metal wire or several metal wires 36 which are particularly preferably coated with a catalytic material or may be fabricated in their entirety of a catalytically active material as, for example, platinum, palladium or similar materials, are in intimate thermal contact with the carrier structure 28. At the other end, a length of at least 3 mm and up to 10 mm, preferably about 5 mm, of the end sections of the metal wires is exposed to the flame front produced by ignition of the fuel/air mixture by means of the activation device, being heated by this flame front in an extremely efficient manner. This is in particular due to the fact that the starter catalyst has a very large surface protruding into the flame front by comparison with the cross-section of the metal wires. Owing to the small cross-section of the metal wires, the heat dissipation is less than in the main catalyst, enabling the metal wires coated with the catalytic material to heat rapidly to values in the range of their activation temperature, even in the presence of relatively weak flame fronts. Experience has shown that the activating ability of the catalytically coated carrier structure is excellent in particular when the ratio $V/Q$ of the ignitable volume V to the cross-section Q of the metal wire or wires 36 is adjusted to values greater than $10^6$ mm, in particular $1.04 \times 10^6$ mm. Preferably, the metal wire is fabricated of a heat conductor alloy, for example, Cr Al 20 5, having a diameter of less than 0.3 mm, in particular between 0.03 and 0.1 mm and preferably between 0.04 mm and 0.07 mm.

As a result of the ignition explosion, the starter catalyst 34 is initially heated to a temperature above its activation temperature (LOT), enabling the catalytic reaction to set in on the metal wires 36. Following a certain period, a sufficient amount of heat has been transferred from the starter catalyst 34 to the carrier structure 28, causing it to be heated to a temperature above its activation temperature at least at the junctions with the starter catalyst 34 and performing the catalytic conversion of the mixture. As a result, the combustible mixture is withdrawn from the downstream metal wires 36 of the starter catalyst 34, so that the catalytic combustion at the starter catalyst 34 is extinguished. The conversion is then performed on the carrier structure 28 exclusively.

Figure 3:
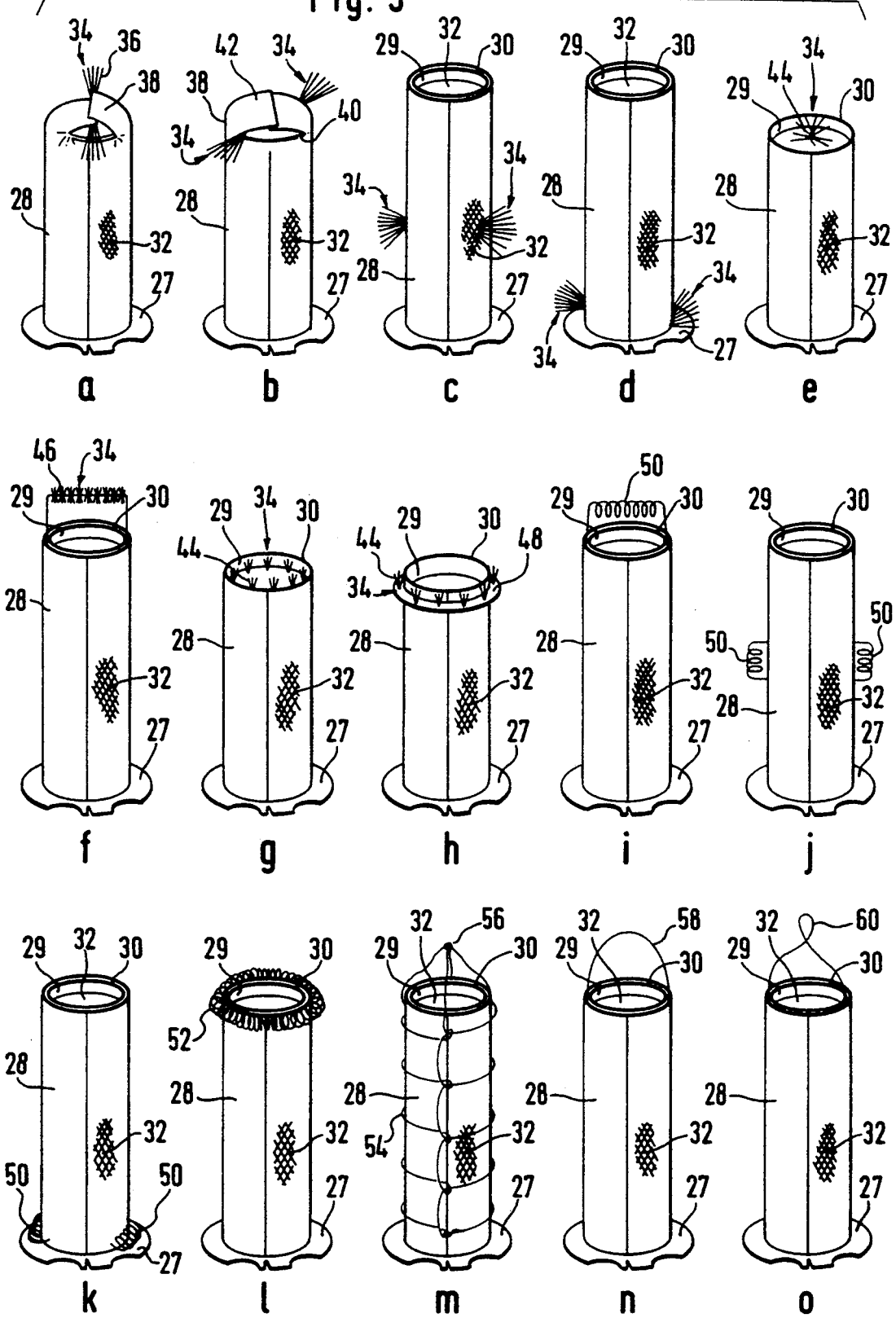
FIGS. 3a to 3o are various embodiments of a starter catalyst.

Further embodiments of the present invention are disclosed in FIG. 3. In FIG. 3a, the carrier structure 28, rather than having a lid, is provided with beaded cylinder walls in which the metal wires 36 or the strand are embedded. As in the embodiment of FIG. 2, two tufts are formed by metal wires 36 arranged on either side of the carrier structure 28. In FIG. 3b, the cylinder wall 38 is provided with several, in particular four, axially extending cutouts 40 into which the starter catalyst 34 is placed. The wall segments 42 formed between the cutouts 40 are subsequently folded down and welded together, where applicable.

According to FIGS. 3c and 3d, the starter catalyst 34 may also be arranged in the mid-portion of the carrier structure 28 and, respectively, in the area proximate to the holding ring 27.

In FIG. 3e, a wire tuft 44 comprised of individual metal wires 36 is arranged on top of the lid 29 in the center thereof. FIG. 3f shows a cluster 46 of wires twisted in the manner of a bottle brush which is arranged at a distance to the lid 29 of the carrier structure 28 and has either end thereof secured to the carrier structure 28. Another embodiment becomes apparent from FIG. 3g in which a plurality of wire tufts 44 are secured to the surface of the lid 29. In a variant of this embodiment, the carrier structure 28 has its downstream end embraced by a circular ring 48 on which a plurality of wire tufts 44 are arranged.

The embodiments of FIGS. 3i, j and k show a metal wire 36 formed into one or several spirals 50 arranged, respectively, in the area proximate to the lid 29, in the mid-portion of the carrier structure 28 and at the base of the carrier structure 28 in the area proximate to the holding ring. In FIG. 3l, the carrier structure 28 is embraced by an annular spiral forming a circular ring 52 in the area proximate to the lid 29. In a further embodiment shown in FIG. 3m, the metal wire 36 is formed into wire meshes 54 surrounding the carrier structure 28 and converging into a knot 56 in a section above the lid 29.

FIGS. 3n and 3o show that it is also readily possible to form the metal wire or wires 36 into one or several wire arcs 58, one or several wire loops 60 or, as another alternative, into a cockscomb structure provided with points or crests.

A feature all embodiments have in common is that they afford advantages differing in dependence on the configuration of the carrier structure 28 or the body to be heated which surrounds the carrier structure 28. Which of the disclosed embodiments of the starter catalyst 34 is selected depends essentially on the individual properties of the heatable appliance and is largely within the discretion of those in the art who are in charge of the selection. It will be understood that the advantageous catalytic coating of the metal wire 36 has or may have the same properties as the coating of the carrier structure 28 and is in particular configured according to U.S. patent application Ser. No. 07/910,266.

Figure 4A:
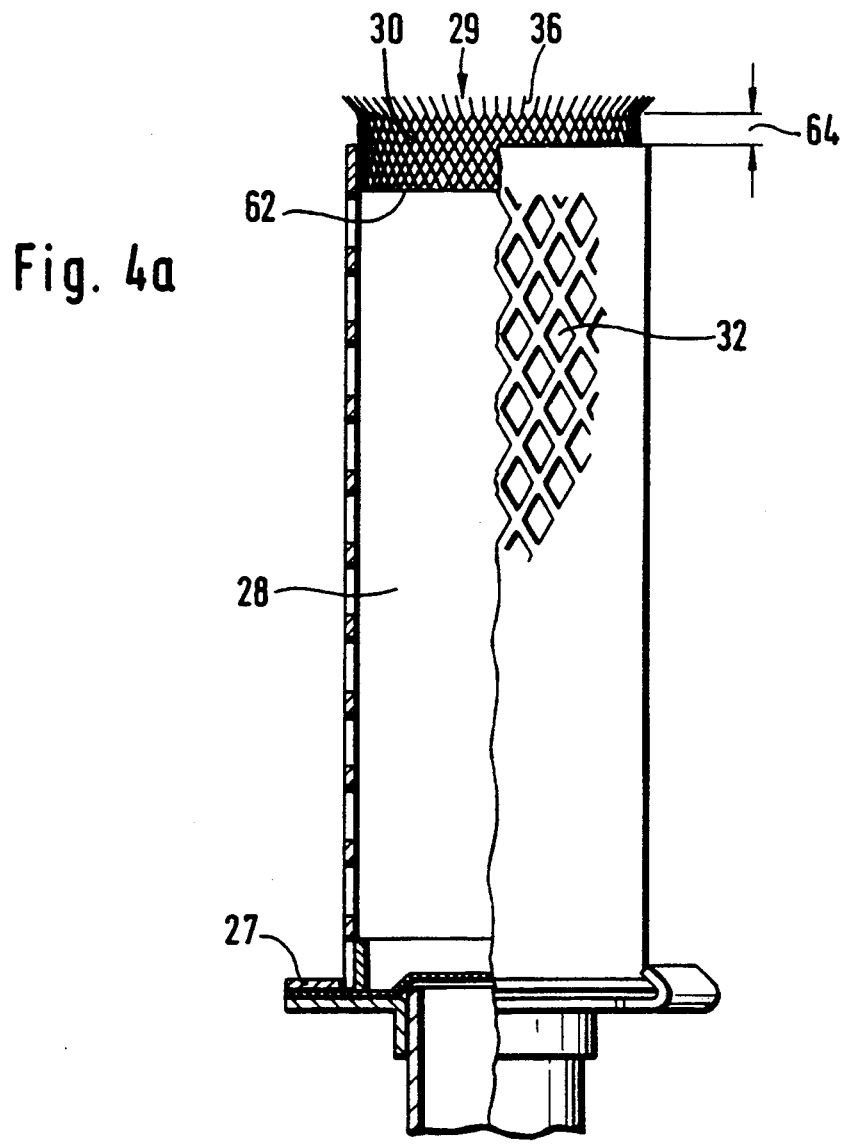
FIGS. 4a to 4c are further embodiments of a starter catalyst formed of a lid made of wire mesh.
Figure 4B:
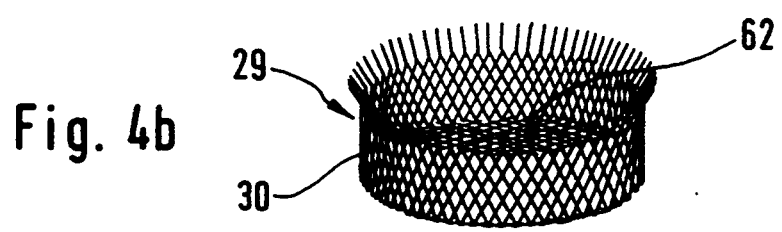

FIG. 4 discloses further embodiments of a catalyst comprising a carrier structure 28 and a lid 29. The carrier structure 28 has essentially the form of a hollow cylinder and is open at both ends of the cylinder. The carrier structure 28 has its bottom end connected to a holding ring 27, while its top end receives the lid 29 whose outside diameter is conformed to the inside diameter of the carrier structure. The lid 29 includes a bottom member 62 to which an annular wall 30 is joined, and it is made of a wire mesh preferably fabricated of the same material as the carrier structure 28. A particularly good function of the lid 29 as a starter catalyst is ensured if the mesh uses wire of a diameter of less than 100 micrometers, preferably of a diameter in the range of 50 micrometers $+/-15$ micrometers. The mesh size is preferably in the range of 270 micrometers $+/-100$ micrometers. The special dimensioning is determined in that the mesh size selected dictates the length of the free ends of the individual wires 36. The lid 29 is welded to the carrier structure 28 at several points. The annular wall 30 of the lid 29 may have a projection 64 relative to the top end of the carrier structure 28 which is in the range of between 0 and 5 mm. Preferably, a projection 64 in the range of between 0.5 mm to 2 mm is employed. The lid is manufactured in particular by deep-drawing, the wire ends 36 at the upper end of the annular wall 30 performing the function of the starter catalyst. Advantageously, the lid 29 is welded to the carrier structure at several locations, with the projection 64 of the annular wall 30 being angled in outward direction preferably by an angle greater than 30°, in particular about 45° to 135°, relative to the longitudinal axis of the carrier structure 28. This ensures reliable starting of the catalyst in the entire application range, because an intimate contact is established between the lid 29 and the carrier structure 28 at several locations. Preferably, the junctions between the lid 29 and the carrier structure 28 which serve as heat conducting bridges lie in the area of those locations at the catalyst that are first hit by the flame front when the ignition explosion occurs.

Figure 4C:
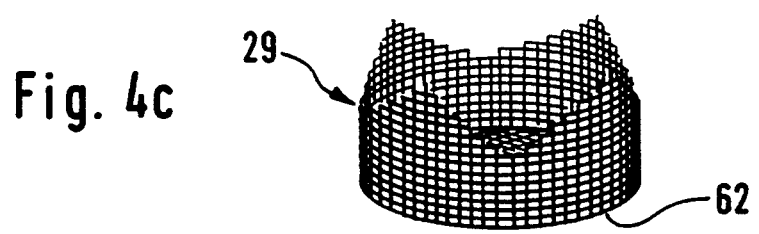

Advantageously, the lid 29 is severed from the wire mesh as a square or rectangular, plane blank which subsequently undergoes a deep-drawing operation to produce the bottom member 62 with the annular wall 30 formed thereon. Where a rectangular blank is used, the annular wall 30 has four triangular projections similar to a crown (FIG. 4c). It has proved to be highly advantageous to cut the blank diagonally to the wires of the wire mesh. Following the deep-drawing operation of the blank, some of the cross wires of the projections will fall out, producing several isolated and freely exposed wire ends 36 which are particularly well suited for use as a starter catalyst.

In a particularly advantageous embodiment of the present invention, the cut edges of the wire mesh are curved inwardly in concave fashion, extending equally in essentially diagonal direction to the wires of the wire mesh. By this means, the corner sections of the wire mesh assume the shape of a peak with a vertex angle in the range of between 10° and 45°, thus extending more acutely than in a rectangular blank. After the top cross wires fall out automatically, at least one to three, preferably two longitudinal wires extend freely from the wire mesh with a length of about one to three millimeters. These freely exposed longitudinal wires act primarily as a starter catalyst and are thermally coupled to the actual catalytic body by means of the wire mesh. Practical tests have revealed that such a starter catalyst ensures heating of the main catalyst to the activation temperature in the presence of fuel/air mixture ratios of up to 1 to 37.

We claim:

1. A heatable appliance for personal use, such as a hair-care appliance, including a device for flameless combustion of a fuel/air mixture and an associated activation device for initiating the flameless combustion action, said device comprising stable carrier structure having deposited thereon a catalytically active coating for augmenting the flameless combustion action, and a starter catalyst separately attached to said stable carrier structure, said starter catalyst made of at least one metal wire of less than 0.3 millimeter thickness, and wherein said stable carrier structure includes an annular wall with a plurality of wall segments that form cutouts therein, and said starter catalyst is placed into said cutouts provided on said annular wall and is secured in position by folding down said wall segments adjacent said cutouts.

2. A heatable appliance for personal use, such as a hair-care appliance, including a device for flameless combustion of a fuel/air mixture and an associated activation device for initiating the flameless combustion action, said device comprising stable carrier structure having deposited thereon a catalytically active coating for augmenting the flameless combustion action, and a starter catalyst separately attached to said stable carrier structure, said starter catalyst made of at least one metal wire of less than 0.3 millimeter thickness, and wherein said starter catalyst is in the form of wire mesh lid structure, said lid structure being directly connected to said carrier structure, wherein said lid structure includes a bottom member and an annular wall and has a diameter corresponding approximately to the inside diameter of said carrier structure.

3. The appliance of claim 2 wherein said carrier structure is in the shape of a hollow cylinder and said lid structure is seated on said hollow cylinder.

4. The appliance of claim 2 wherein said wire mesh starter catalyst lid structure is made of wires having a diameter of less than 100 micrometers, with a mesh size between 100 and 800 micrometers.

5. The appliance of claim 2 wherein said annular wall of said lid structure protrudes from said carrier structure by a projection amounting to between zero and five millimeters.

6. The appliance of claim 5 wherein said lid structure is welded to said carrier structure at a plurality of locations, and said projection of said annular wall is angled in outward direction by an angle greater than 30° relative to the longitudinal axis of said carrier structure.

7. A heatable appliance for personal use, such as a hair-care appliance, including a device for flameless combustion of a fuel/air mixture and an associated activation device for initiating the flameless combustion action, said device comprising stable carrier structure having deposited thereon a catalytically active coating for augmenting the flameless combustion action, and a starter catalyst separately attached to said stable carrier structure, said starter catalyst made of at least one metal wire of less than 0.3 millimeter thickness, and further comprising lid structure secured to the downstream end of said carrier structure and wherein said carrier structure includes an annular wall and said at least one metal wire extends along the underside of said lid structure and is secured to said carrier structure at a location between said lid structure and said annular wall of said carrier structure by a connection between said lid structure and said annular wall.

8. The appliance of claim 7, 1 or 2 wherein said metal wire includes catalytically active material.

9. The appliance of claim 7, 1 or 2 wherein said wire thickness of said starter catalyst is in the range of between 0.03 millimeter and 0.1 millimeter.

10. The appliance of claim 8, wherein said activation device is adapted to ignite a fuel/air mixture of a volume V, the ratio V/Q of said volume V to a wire cross-section Q of said starter catalyst being greater than $10^6$ millimeter.

11. The appliance of claim 8 wherein said starter catalyst is in thermal contact with said carrier structure and is secured thereto with a plurality of free, spread-apart sections, each said section having a length in the range of three millimeters to ten millimeters.

12. The appliance of claim 8 wherein said stable carrier is configured as a hollow cylinder and said metal wire is fastened to the downstream end of said hollow cylinder.

13. The appliance of claim 8 wherein said starter catalyst is comprised of five to ten metal wires of a strand configuration which preferably unravel when cut off and which are coated with a catalytically active material.

14. The appliance of claim 8 wherein said starter catalyst includes at least one wire tuft of loop configuration.

15. A heatable appliance for personal use, such as a hair-care appliance, including a device for flameless combustion of a fuel/air mixture and an associated activation device for initiating the flameless combustion action, said device comprising stable carrier structure having deposited thereon a catalytically active coating for augmenting the flameless combustion action, and a starter catalyst separately attached to said stable carrier structure, said starter catalyst made of at least one metal wire of less than 0.3 millimeter thickness, and wherein said starter catalyst is in the form of wire mesh lid structure, said lid structure being directly connected to said carrier structure, wherein said lid structure is a rectangular blank cut diagonally to the wires of said wire mesh, and said rectangular blank is formed into its final shape particularly by a deep-drawing operation.

16. The appliance of claim 15 wherein said lid structure has a plurality of triangular projections.

17. A heatable appliance for personal use, such as a hair-care appliance, including a device for flameless combustion of a fuel/air mixture and an associated activation device for initiating the flameless combustion action, said device comprising stable carrier structure having deposited thereon a catalytically active coating for augmenting the flameless combustion action, and a starter catalyst separately attached to said stable carrier structure, said starter catalyst made of at least one metal wire of less than 0.3 millimeter thickness, and wherein said starter catalyst is in the form of wire mesh lid structure, said lid structure being directly connected to said carrier structure, wherein said lid structure is a blank cut essentially diagonally to the wires of said wire mesh and is curved inwardly in concave fashion.

18. The appliance as claimed in claim 17 wherein said wire mesh has corner sections of peak shape with a vertex angle in the range of between 10° and 45°.

* * * * *